(12) United States Patent
Awada et al.

(10) Patent No.: US 10,659,259 B2
(45) Date of Patent: May 19, 2020

(54) CONFIGURATION AND MANAGEMENT OF AN ACTIVE SET

(71) Applicant: NOKIA SOLUTIONS AND NETWORKS OY, Espoo (FI)

(72) Inventors: Ahmad Awada, Munich (DE); Ingo Viering, Munich (DE); Fasil Berhanu Tesema, Munich (DE)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/072,641

(22) PCT Filed: Jan. 29, 2016

(86) PCT No.: PCT/EP2016/051914
§ 371 (c)(1),
(2) Date: Jul. 26, 2018

(87) PCT Pub. No.: WO2017/129251
PCT Pub. Date: Aug. 3, 2017

(65) Prior Publication Data
US 2019/0036742 A1    Jan. 31, 2019

(51) Int. Cl.
*H03D 1/06* (2006.01)
*H04L 25/03* (2006.01)
(Continued)

(52) U.S. Cl.
CPC ...... *H04L 25/03019* (2013.01); *H04J 11/005* (2013.01); *H04W 36/00837* (2018.08); *H04W 36/18* (2013.01); *H04W 36/30* (2013.01)

(58) Field of Classification Search
CPC ...... H04L 25/03019; H04W 36/00837; H04W 36/18; H04W 36/30; H04J 11/005

USPC ................................. 375/348, 345, 316, 219
See application file for complete search history.

(56) References Cited

U.S. PATENT DOCUMENTS

2006/0182063 A1    8/2006  Ma et al.
2014/0274068 A1    9/2014  Dawid et al.
(Continued)

FOREIGN PATENT DOCUMENTS

EP          2071787 A1     6/2009

OTHER PUBLICATIONS

International Search Report and Written Opinion for International Application PCT/EP2016/051914, dated Jun. 28, 2016, 17 pages.
(Continued)

*Primary Examiner* — Zewdu A Kassa
(74) *Attorney, Agent, or Firm* — Brake Hughes Bellermann LLP

(57) ABSTRACT

There is provided a method comprising: determining an information on an inter-symbol interference between signals on a same frequency resource and a same time resource from one or more first cells and one or more second cells, wherein an active set of the apparatus comprises at least the one or more second cells, the inter-symbol interference is an estimated inter-symbol interference if at least one of the one or more first cells is not in the active set, and the inter-symbol interference is a measured inter-symbol interference if the active set consists of the one or more first cells and the one or more second cells; and deciding whether or not to inform a network comprising the one or more first cells and the one or more second cells on the information on the inter-symbol interference.

20 Claims, 7 Drawing Sheets

(51) Int. Cl.
*H04J 11/00* (2006.01)
*H04W 36/18* (2009.01)
*H04W 36/00* (2009.01)
*H04W 36/30* (2009.01)

(56) References Cited

U.S. PATENT DOCUMENTS

2017/0006509 A1 1/2017 Viering et al.
2017/0064615 A1* 3/2017 Im .................. H04W 48/10
2017/0317856 A1* 11/2017 Lee .................. H04L 25/03006

OTHER PUBLICATIONS

3GPP TS 25.423, V13.1.0; "3rd Generation Partnership Project; Technical Specification Group Radio Access Network; UTRAN Iur Interface Radio Network Subsystem Application Part (RNSAP) Signalling (Release 13)" Dec. 2015, Valbonne, France (1233 pages).
3GPP TS 25.331 V13.1.0; "3rd Generation Partnership Project; Technical Specification Group Radio Access Network; Radio Resource Control (RRC); Protocol specification (Release 13)" Dec. 2015, Valbonne, France (57 pages).
3GPP TR 36.819 V11.2.0,"3rd Generation Partnership Project; Technical Specification Group Radio Access Network; Coordinated multi-point operation for LTE physical layer aspects (Release 11)"; Sep. 2013, Valbonne, France (70 pages).
Brugger et al.; "OFDM receivers—impact on coverage of intersymbol interference and FFT window positioning"; EBU Technical Review; Jul. 25, 2003 (12 pages).
Mogensen et al.; "Centimeter-wave-concept for 5G ultra-dense small cells"; IEEE Vehicular Technology Conference; 2014; Aalborg University, Denmark (7 pages).
Office Action for European Application No. 16702522.0, dated Oct. 24, 2019, 9 pages.

* cited by examiner

CONFIGURATION AND MANAGEMENT OF AN ACTIVE SET

CROSS-REFERENCE TO RELATED APPLICATIONS

This application is a national stage entry of PCT Application No. PCT/EP2016/051914 filed Jan. 29, 2016, entitled "CONFIGURATION AND MANAGEMENT OF AN ACTIVE SET" which is hereby incorporated by reference in its entirety.

FIELD OF THE INVENTION

The present invention relates to an apparatus, a method, and a computer program product related to configuration and management of an active set. More particularly, the present invention relates to an apparatus, a method, and a computer program product related to configuration and management of an active set in a single frequency network.

ABBREVIATIONS

3G $3^{rd}$ Generation
3GPP $3^{rd}$ Generation Partnership Project
5G $5^{th}$ Generation
CGI Cell Global Identity
CoMP Cooperative Multi-Point
CP Cyclic Prefix
DL Downlink
eMBMS enhanced Multimedia Broadcast Multicast System
FFT Fast Fourier Transform
GP Guard Period
ICI Inter-Carrier Interference
IE Information Element
ISI Inter-Symbol Interference
LTE Long Term Evolution
MBSFN Multimedia Broadcast Single-Frequency Network
OFDM Orthogonal Frequency Division Multiplex
OFDMA Orthogonal Frequency Division Multiple Access
O&M Operation & Maintenance
PCell Primary Cell
PCI Physical Cell Identity
PDP Power Delay Profile
RLF Radio Link Failure
SFN Single-Frequency Network
SINR Signal-to-Interference and Noise Ratio
TS Technical Specification
TX Transmitter
UE User Equipment
UL Uplink

BACKGROUND OF THE INVENTION

Conventional Handover/Measurement Report

Conventionally, a mobile terminal is connected to a single cell. When it moves from the serving area of one cell to the serving area of another cell, typically a handover is initiated. The full picture of all cells in the surrounding of the terminal is only available at this terminal itself. However, a general paradigm of a well-organized network is that the network makes the mobility decisions, and not the terminal.

One solution would be that the terminal permanently sends measurement reports to the network. However, this is too much overhead in terms of required signalling. Instead, the $3^{rd}$ Generation Partnership Project (3GPP) specification allows configuring triggers for the terminal. If such a network-configured trigger expires in the terminal, the terminal will send a measurement report. It is recommendable that the network configures the triggers such that a handover is initiated when such a measurement report is received. This minimizes the number of measurement reports.

For intra-frequency handovers in LTE, the most prominent trigger for a measurement report is the A3 trigger which is defined as follows (simplified):

$$Mn+Ocn>Ms+Off \qquad \text{Eq. (1)}$$

It expires if the measurement Mn of a neighbour n is offset Off better than the measurement Ms of a serving cell. The measurements could be given as signal strength or as a signal quality.

The offset Off introduces a kind of hysteresis to the handover decision to avoid ping-pongs.

Ocn is another offset (also called "cell individual offset") which, in contrast to Off, is neighbour-specific. It can be used to fine-adjust the handovers individually towards different neighbours due to mobility robustness reasons (e.g. make the neighbour more attractive if it is entered through a high-speed street), or due to load balancing reasons (e.g. make the neighbour more attractive if it is low loaded).

Multi-Connectivity

With multi-connectivity there is not only a single serving cell, but there are multiple serving cells. In this application, the set of serving cells is sometimes called "active set".

The active set is UE-specific and is configured by the network using the measurements reports sent by the UE. As the UE moves, new detected cells will be added to the active set and others will be removed from the active set as their signals become weaker.

FIG. 1 shows an example of an active set consisting of three cells 1001, 1002, 1003 serving a terminal 1010 (serving is indicated by solid arrows). The terminal 1010 is moving in the direction of dashed arrow 1011 and approaches cell 1004, which is not in the active set. The network may decide to add cell 1004 to the active set and/or to remove cell 1001, and reconfigures the terminal with a new active set.

In one of the multi-connectivity schemes foreseen for 5G systems using OFDMA as physical layer technology, all the cells of the active set will transmit synchronously the same signal on data and control channels and on the same time and frequency resource. This transmission scheme provides a combining gain to Signal-to-Interference and Noise Ratio (SINR), and consequently, improves the mobility of the UE by reducing Radio Link Failures (RLFs) and enhances cell-edge throughput [1]. This solution is different from LTE "Cooperative Multi-Point" (CoMP) transmission where the control plane is handled only by one cell of the active set called Primary Cell (PCell), i.e., no gain is provided on control channel, and the connection of the UE depends purely on the link of PCell.

This low layer multi-connectivity scheme is denoted in the sequel by "Single-Frequency Network" (SFN) transmission in analogy to enhanced Multimedia Broadcast Multicast System (eMBMS) where all the cells belonging to a specific Multimedia Broadcast SFN (MBSFN) area transmit the same signal in MBMS subframes.

Some prior art is described in the following:

1. Active Set Configuration for 3G Soft Handover

3GPP has already defined triggers for configuring and maintaining an active set for 3G Soft Handover. For instance, 3GPP TS 25.331 has defined the "1A" event which is defined as (simplified)

$$Mn + Ocn > \max_{s \in A}(Ms) + \text{Off}_{add} \qquad \text{Eq. (2)}$$

where the symbol A is used for the active set, i.e. A is a set consisting of a number of serving cells s1, s2, . . . .

Such a condition expires if the measurement Mn of a "new" cell n is offset better then the measurement of the best cell in the current active set. The expiry would trigger a measurement report to the base station, and the base station would add the new cell n to the active set.

Here, in contrast to a typical hysteresis value used in single-connectivity, $\text{Off}_{add}$ is likely to be a negative value, i.e. you would add a cell to the active set, even if it is still weaker then the best cell.

Equivalent to the definition of 1A trigger event, there exists a second trigger event 1B to remove a cell from the active set. The network removes a cell s0 from the active set A when a measurement report is received which has been triggered by the following condition:

$$Ms0 + Ocs0 < \max_{s \in A}(Ms) + \text{Off}_{remove} \qquad \text{Eq. (3)}$$

i.e. a cell would be removed if it falls significantly below the best cell (for a certain time to trigger).

In order to avoid the alternating addition and removal of the same cell (similar to a ping-pong), there should be a difference between $\text{Off}_{add}$ and $\text{Off}_{remove}$.

Example: Ocn=0; Ocs0=0; (for simplicity); $\text{Off}_{add}$=−6 dB; $\text{Off}_{remove}$=−8 dB:

A cell would be added using event 1A when it comes closer than 6 dB to the best cell:

$$Mn > \max_{s \in A}(Ms) - 6 \text{ dB}$$

A cell would be removed using event 1B when it falls more than 6 dB below the best cell:

$$Mn < \max_{s \in A}(Ms) - 8 \text{ dB}$$

This condition is to be fulfilled for a certain time period ("time to trigger"), whereas in every time instance the condition is evaluated using the best of all cells. There is also an event 1C defined in 3GPP TS 25.331 for replacing the weakest cell in the active set with a better one not in the active set.

These triggers defined for 3G Soft Handover ensure that the relevant cells, in terms of signal strength/quality, are in the active set of the UE. The received signals of these cells are combined at the UE using the Rake receiver which compensates for the difference in the arrival times of the signals. Thus, in 3G systems the receiver does not have the same constraint imposed by the CP in OFDM-based network where combining gain is achieved only if the signals of different cells are received within the CP duration.

2. Extension of CP and Re-Use of Triggers Defined for 3G Soft Handover

The frame structure foreseen for 5G cmWave technology for ultra-dense small cell deployments is shown in FIG. 4. The current frame numerology for 5G cmWave technology assumes one subframe of 250 µs consisting of 14 OFDM symbols with total symbol duration $T_s = T_u + T_{CP} = 16.67 + 1 = 17.67$ µs and 3 Guard Period (GP), each of 0.89 µs. The first two symbols are used for downlink (DL) and uplink (UL) control channels whereas the rest 12 OFDM symbols are used either for DL or UL data transmission.

The sub-carrier spacing is $1/T_u = 60$ kHz and the total overhead of CP and GP is (14*1 µs+3*0.89 µs)/250 µs=6.67%.

In principle, the CP could be extended to ensure that the signals of the cells in the active set, selected using the defined triggers for 3G soft handover, do not cause ISI. However, the value of the new CP will have some dependency on the value of the negative offset $\text{Off}_{add}$ of Eq. (2): The lower the add offset $\text{Off}_{add}$, the higher the probability is of adding cells whose signals are falling outside the FFT window and causing ISI. As such, to avoid multiple CP designs the CP should be extended to capture the worst-case scenario corresponding to the lowest value configurable for $\text{Off}_{add}$ if it is known beforehand. This requirement is challenging considering the drawbacks of extending the CP which are described in the following.

If the overhead of CP and GP is to be kept constant, extension of CP would be at the expense of a more vulnerable system with respect to Inter-Carrier Interference (ICI) and reduction in supported user mobility speed. For instance, consider the case of doubling the CP from 1 µs to 2 µs. To keep the same overhead ratio of CP and GP, 7 OFDM symbols with symbol duration of $T_s = T_u + T_{CP} = 33.33$ µs+2 µs=35.33 us would fit in one TTI of 250 µs. As such, the sub-carrier spacing is reduced from 60 kHz to 1/33.33 µs=30 kHz leading to halving the maximum tolerable Doppler spread and in turn the supported user velocity.

On the other hand, if the subcarrier spacing is kept fixed to 60 kHz and CP is doubled from 1 µs to 2 µs, the new total symbol duration $T_s$ would be equal to $T_u + T_{CP} = 16.67$ µs+2 µs=18.67 µs leading to an increase in the overhead of CP with respect to $T_s$ from 1 µs/17.67 µs=5.66% to 2 µs/18.67 µs=10.71%.

Extension of CP has then drawbacks on either the supported user velocity or on the overhead and capacity of the system.

Moreover, there is another problem that can still occur and cannot be solved even if the CP had been extended: A UE configured with an active set of cells has to constantly update the position of the FFT window to account for the changes in the delays of the received signals caused by UE movement or by variations in the environment. As such, it could happen that at some time instant some of the cells in the active set start to generate significant amount of ISI due to a shift in the position of the FFT window. Using prior-art scheme defined for 3G soft handover, these cells cannot be removed from the active set as long as the measurement event 1B (or similar event) for removing a cell did not expire.

SUMMARY OF THE INVENTION

It is an object of the present invention to improve the prior art.

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims. According to some example embodiments of the invention, at least one of the following technical effects may be provided:

- Inter-symbol interference is substantially avoided while the performance gains for the multi-connectivity scheme are maintained;
- drawbacks of CP extension such as increased overhead or reduced tolerable user velocity are avoided;
- signaling effort may be limited/reduced.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of example embodiments of the present invention which is to be taken in conjunction with the appended drawings, wherein.

DETAILED DESCRIPTION OF CERTAIN EXAMPLE EMBODIMENTS

Herein below, certain example embodiments of the present invention are described in detail with reference to the accompanying drawings, wherein the features of the example embodiments can be freely combined with each other unless otherwise described. However, it is to be expressly understood that the description of certain embodiments is given for by way of example only, and that it is by no way intended to be understood as limiting the invention to the disclosed details.

Moreover, it is to be understood that the apparatus is configured to perform the corresponding method, although in some cases only the apparatus or only the method are described.

Some embodiments of this invention relate to low-layer intra-frequency multi-connectivity, and more specifically to the configuration and management of an active set of cells serving a mobile terminal in an Orthogonal Frequency Division Multiple Access (OFDMA)-based network such as Long Term Evolution (LTE) or a $5^{th}$ Generation (5G) network. An underlying assumption is that a number of cells jointly transmit signals to single UE. It is focused on the case where all cells are on the same frequency layer ("intra-frequency case").

If the UE is served by plural cells of the active set in a low layer multi-connectivity scheme (such as SFN), the UE receiver may constructively combine the multiple copies of the signal from different cells of the active set provided that they are received within the duration of Cyclic Prefix (CP) which is attached at the beginning of each OFDM symbol. Otherwise, Inter-Symbol Interference (ISI) occurs as the symbol received with higher delay overlaps with the subsequent symbol from a transmitting station with much smaller delay. Herein, it is assumed that the same CP designed for unicast transmission would be re-used for SFN transmission.

Figure 2:
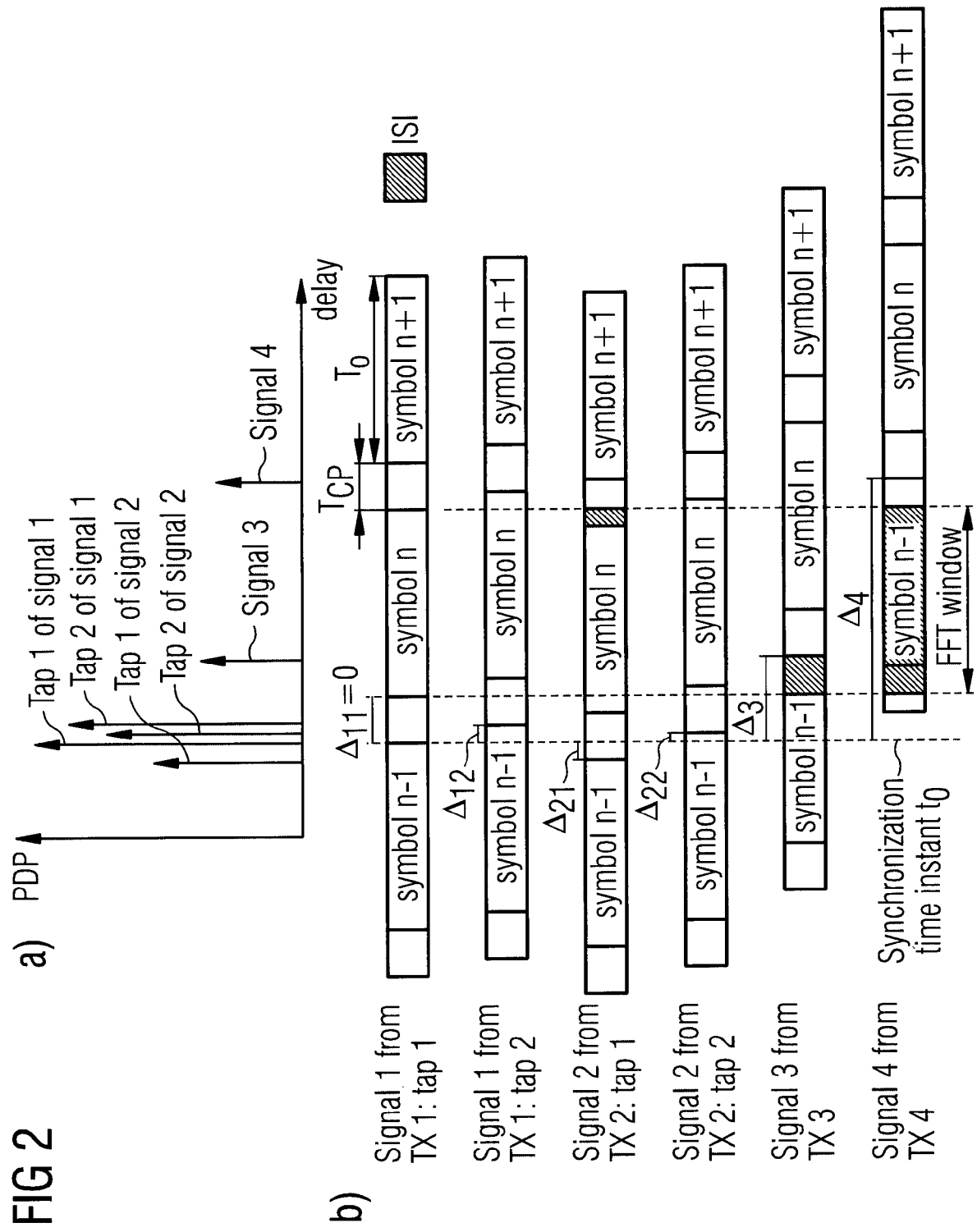
FIG. 2 shows an example of time synchronization and positioning of the FFT window.

For illustration, FIG. 2 shows the case of an active set having four cells transmitting synchronously the same signal to an UE. FIG. 2a) shows an illustrative Power Delay Profiles (PDP) of the signal from each transmitter (TX), summarized into a single diagram of an overall PDP: PDPs of signals 1 and 2 are each assumed to have two taps (i.e.: points in time where a sufficient signal strength is received at the receiver of the UE; a tap may be e.g. at the time of the maximum of the respective peak, or at the time where the sufficient signal strength is first (last) received in a peak), whereas PDPs of signals 3 and 4 each have only one tap, i.e., no multipath components. Note that the signals received from the cells of the active set carry the same information and can be treated as "multipath" components from the UE receiver perspective.

The receiver would position the Fast Fourier Transform (FFT) window which is time period for demodulating the OFDM symbol in such a way that a minimum of ISI occurs (see e.g. Roland Brugger and David Hemingway: OFDM receiver, impact on coverage of inter-symbol interference and FFT window positioning, https://tech.ebu.ch/docs/techreview/trev_295-brugger.pdf). There are several methods for positioning the FFT window and the choice is left for UE implementation. In the example of FIG. 2b), the UE synchronizes to time instant to which corresponds to the arrival time instant of the strongest tap corresponding to the first tap of signal 1. As such, the taps of signal 1 and the second tap of signal 2 are received within the duration of the CP ($T_{CP}$), i.e., their corresponding positive delays $\Delta_{11}$, $\Delta_{12}$, and $\Delta_{22}$ with respect to $t_0$ are smaller than $T_{CP}$. Consequently, they all contribute to the total useful power since all the samples captured by the FFT window are from the same OFDM symbol n stemming from signal 1 and the second tap of signal 2.

Signal 3 and signal 4 cause partial and full ISI, respectively, since their corresponding positive delays $\Delta_3$ and $\Delta_4$ are greater than $T_{CP}$, i.e., FFT window positioned by the UE for demodulating OFDM symbol n contains samples from OFDM symbol n-1 stemming from signal 3 and 4. Moreover, the first tap of signal 2 has a negative delay $\Delta_{21}$ with respect to $t_0$ and causes partial ISI. A signal can still contribute to the total receiver power as long as its corresponding delay $\Delta$ with respect to $t_0$ is less than Tp if $\Delta>0$; or $\Delta>T_{CP}$-Tp if $\Delta<0$ where $Tp>T_{CP}$ is a design parameter whose value depends on the positioning of the pilots carriers used for coherent demodulation in the frequency and time domain of the radio frame.

Figure 1:
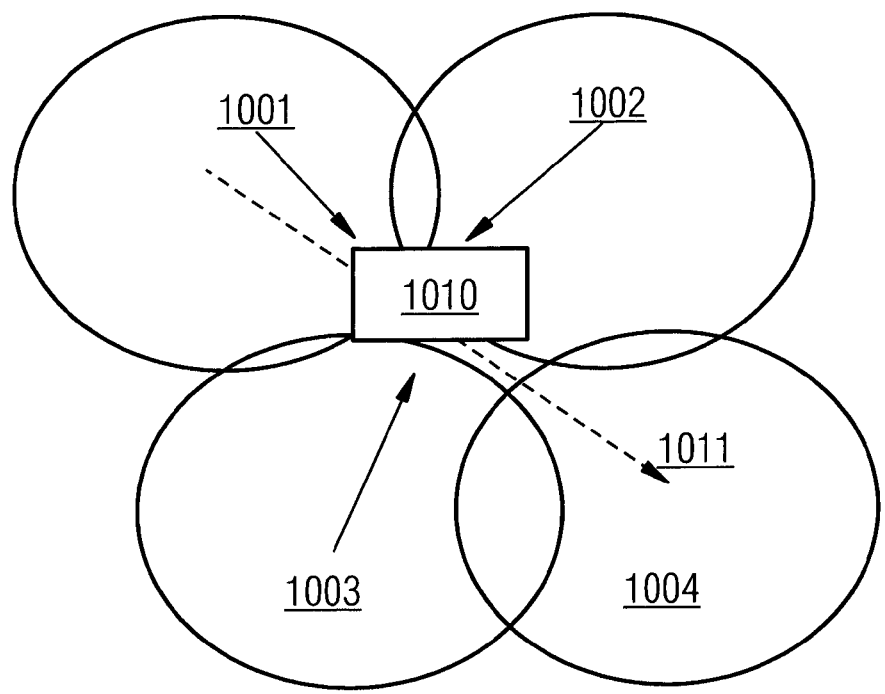
FIG. 1 shows an example of an active set.
Figure 3:
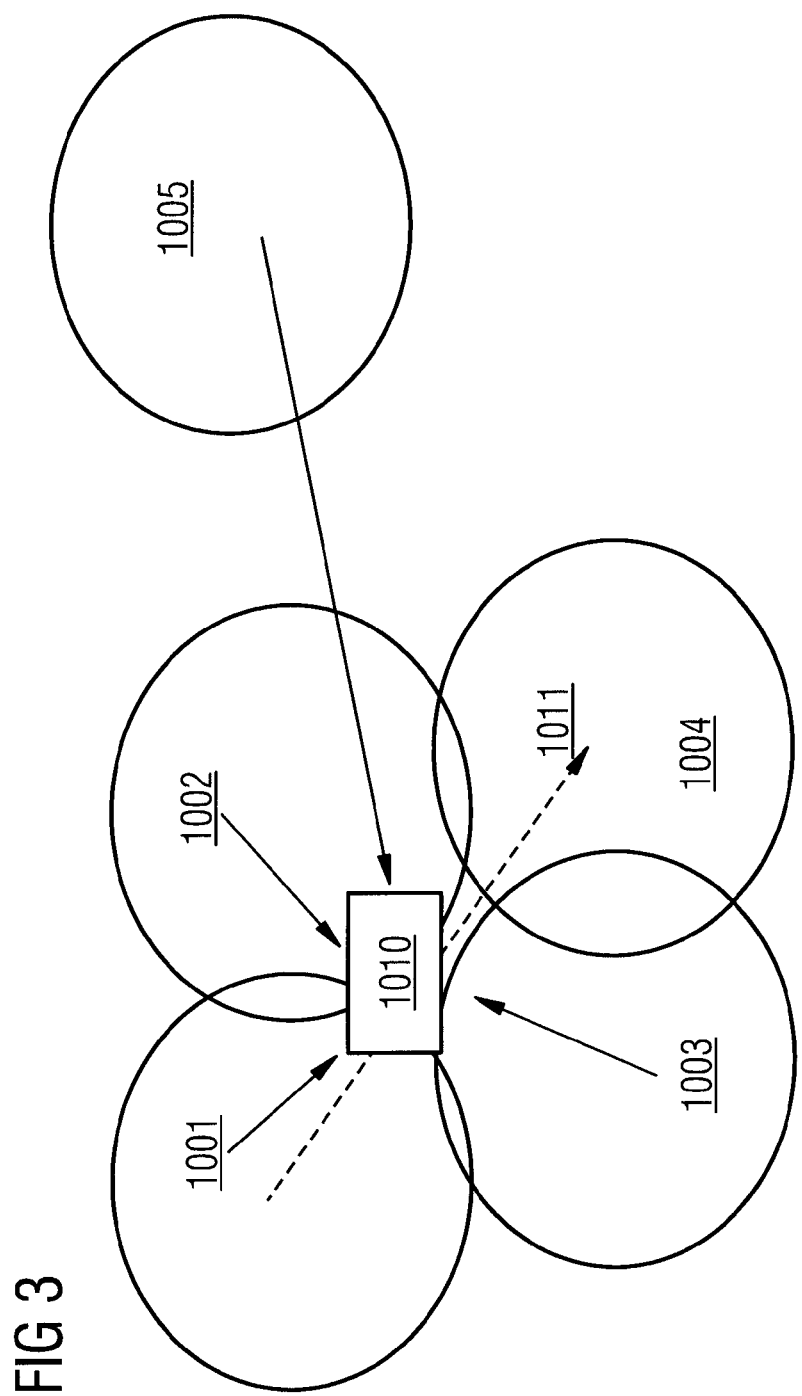
FIG. 3 shows another example of an active set.
Figure 4:
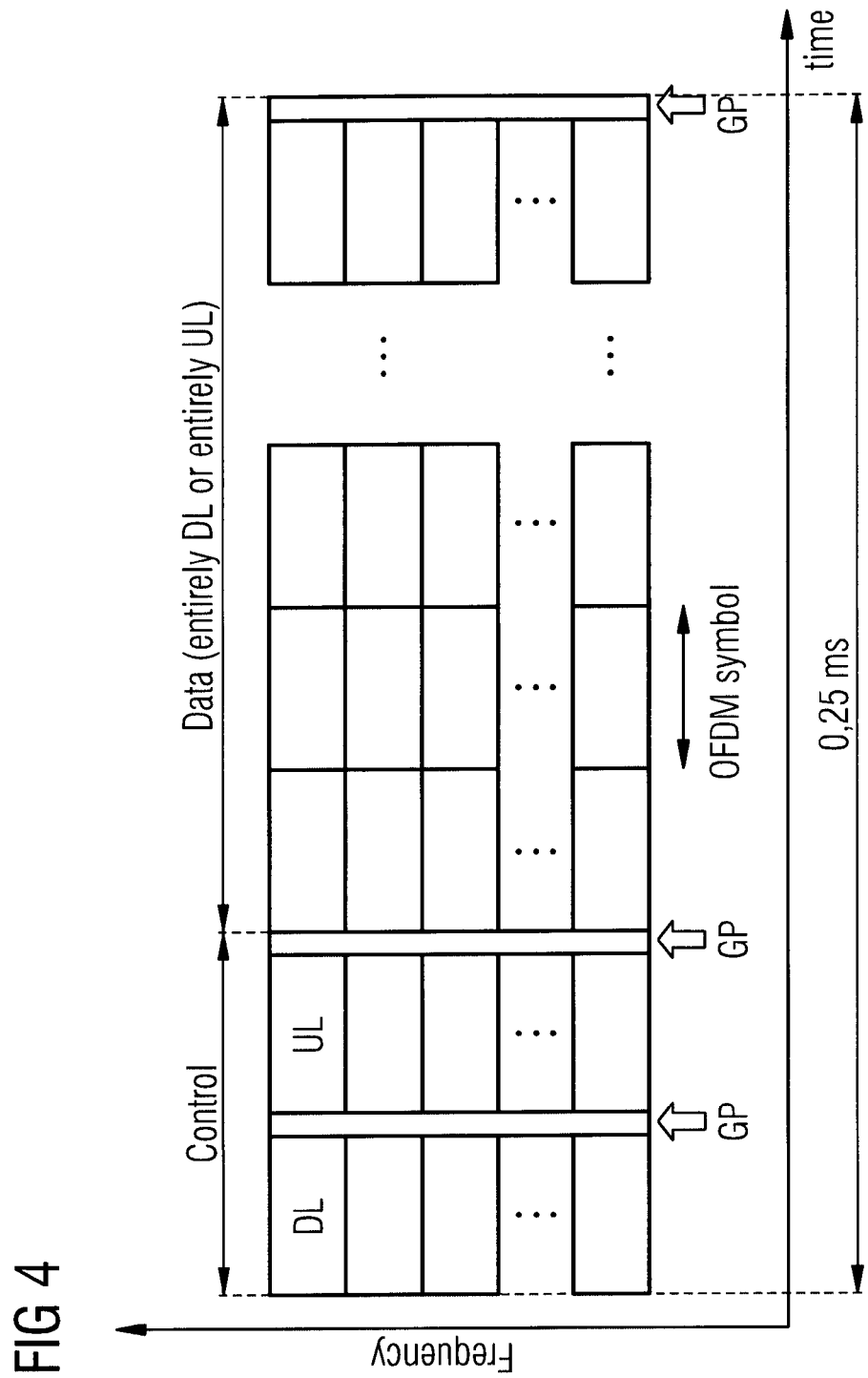
FIG. 4 shows a frame structure foreseen for 5G cmWave technology.

As shown in FIG. 2, some cells of the active set can cause significant amount of ISI depending on their corresponding arrival times and can cause severe degradation in SINR. For instance, this can happen when the active set comprises one or more cell(s) which are far away but have a line of sight or a strong reflection (classical coverage overshoot) as shown in FIG. 3. FIG. 3 corresponds to FIG. 1, but the active set comprises, in addition to cells 1001, 1002, and 1003, a cell 1005 which is far away from the terminal but has a high signal strength (and/or signal quality) at the terminal. The power contribution of the signal from cell 1005 might be significant causing severe ISI. As such, proper schemes are recommendable for configuring and maintaining an active set for the UE in case of SFN transmission in multi-connectivity context.

If the same triggers as those defined for 3G Soft Handover are re-used for OFDM-based network (e.g. events 1A, 1B, 1C, as described above), there will be no guarantee that the signals of the cells in the active set will be received at the UE receiver within the duration of the CP, as illustrated in FIG. 2. As such, it could happen that adding a cell to the active set leads to a degradation in the SINR if it causes a significant amount of ISI. Hence, new schemes for active set configuration and management are needed for OFDM-based networks.

Embodiments of the invention provide new schemes for configuring and maintaining the active set of the UE such that a special treatment may be applied to cells whose signal strength/quality qualifies them to be a member of the active set, but whose delay profile does not fit into the cyclic prefix and thus would e.g. cause significant amount of ISI in case of SFN transmission. Such a special treatment could be for instance to not include such a cell into the active set at all, or to keep it in the active set but suppress the transmission of this cell (this cell would "blank" instead of joining the transmission). A cell which is in the active set but does not transmit to the terminal may still receive the uplink signals from the terminal and evaluate them.

In embodiments of the invention, the triggers as defined for 3G soft handover may still be used, but using other triggers for adding, replacing and/or removing cells from the active set (also denoted as current active set) or a mixture of such triggers is possible, too.

Figure 5:
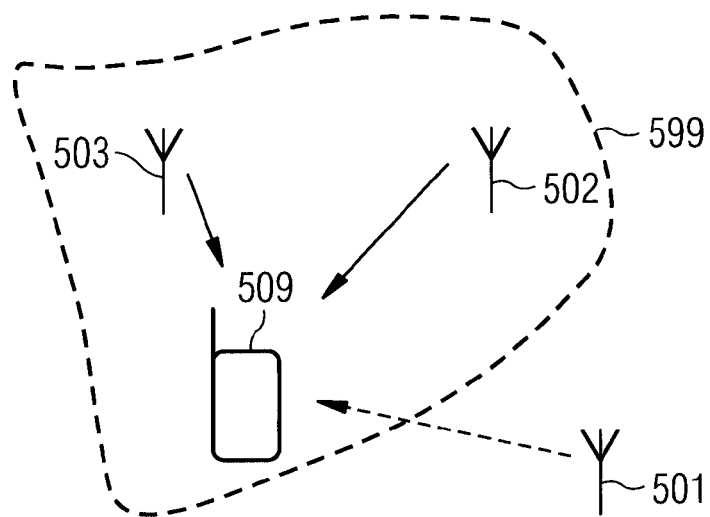
FIG. 5 shows a use case according to an embodiment of the invention.
Figure 6:
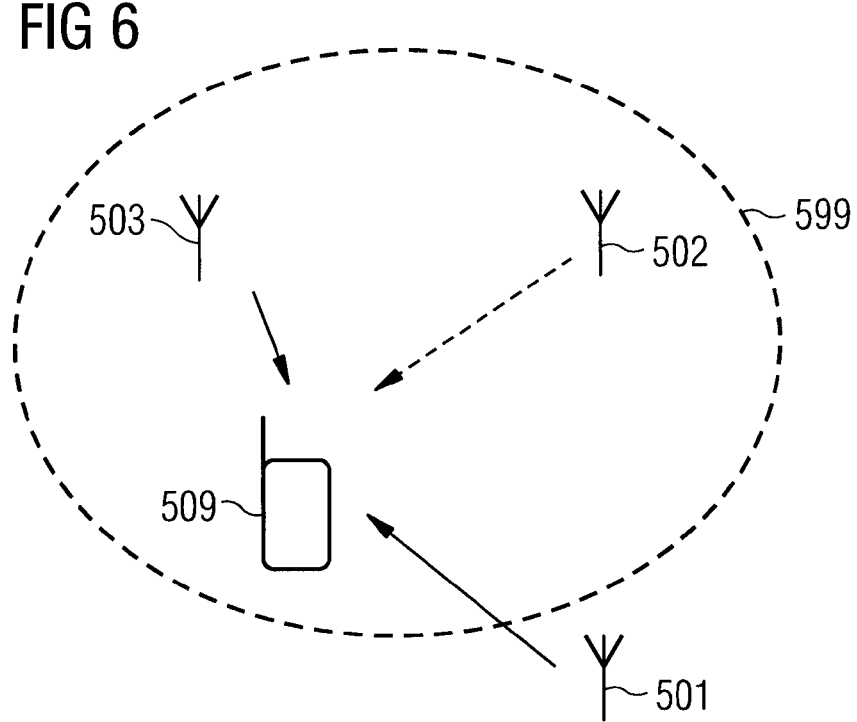
FIG. 6 shows a use case according to an embodiment of the invention.
Figure 7:
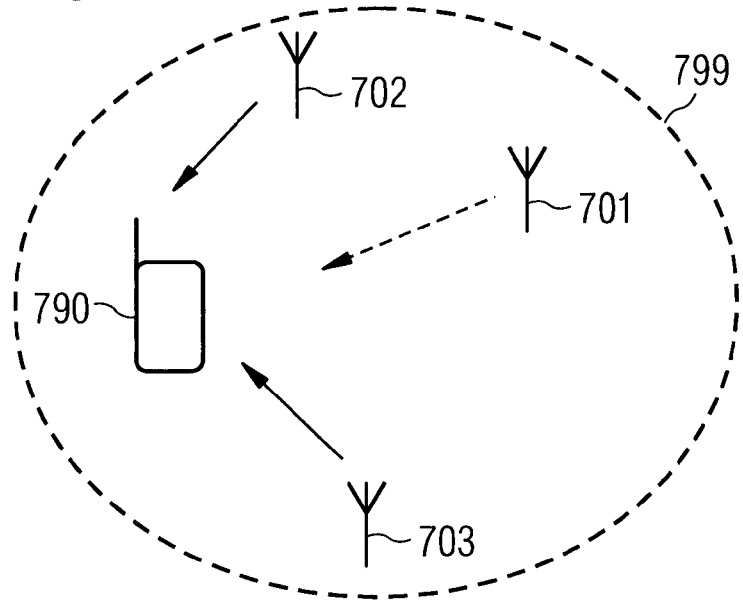
FIG. 7 shows a use case according to an embodiment of the invention.

Some use cases according to embodiments of the invention are depicted in FIGS. 5 to 7.

As shown in FIG. 5, a current active set 599 of a UE 590 consists of one or more second cells (e.g. cells 502, 503). A first cell 501, which is not in the current active set, has been detected by the UE and may be applicable (candidate) to be added to the active set 599, e.g. because it has a sufficient signal strength. There may be other criteria than signal strength for determining applicability of a detected cell.

In this case, a tentative active set consisting of the second cells 502 and 503 of the current active set and any new detected candidate cells, such as the first cell 501, is formed (either by the UE or the network, as will be explained). Then it is estimated if the ISI caused by the first cell 501 in the tentative active set would be larger than a predetermined threshold. If the ISI would be larger, the first cell 501 may not be added to the active set. If the ISI would not be larger, the first cell 501 may be added to the active set. It should be noted that there may be more than one first cells outside the current active set 599 and each of them may be simultaneously considered as being part of the tentative active set. Then the ISI caused by each of the first cells 501 may be checked, and determination whether or not to add a given first cell 501 to the active set may be done.

As shown in FIG. 6, the source of the ISI to the tentative active set may not be the first cell 501 locating outside the active set 599. The ISI source may be one of the current cells in the current active set 599, i.e. one of the second cells, such as cell 502. Accordingly, in addition to considering whether or not the first cells 501 cause significant ISI, it may also be considered how each of the second cells 502, 503 contribute in generation of ISI in the tentative active set.

If the ISI from any of the second cells, e.g. from cell 502, would be larger than the predetermined interference threshold, the second cell 702 may be removed from the active set 599. If the ISI from a given second cell (e.g. cell 502) would not be larger than the predetermined interference threshold, the second cell 702 may be kept in the active set 599.

It may be worth noting that regardless of how the second cells 502, 503 are treated (kept or removed), decision regarding adding or not adding one or more first cells 501 to the active set 599 may be made. Therefore, the decision to keep a cell or remove a cell is done separately for each cell separately by checking how that specific cell contributes to the ISI of a combined signal, although for the decision making a common time window with respect to the tentative active set is formed.

The combined signal is the signal obtained by combining the signals from the one or more first cells 501 and the one or more second cells 502, 503 (i.e. the cells forming the tentative active set). The UE 590 demodulates the combined signal by using the common time window (FFT window), wherein the common time window placement depends on the power delay profiles of the cells 501-503 that belong to the tentative active set and contribute to the combined signal.

As shown in FIG. 7, in an embodiment, a current active set 799 of a UE 790 consists of one or more second cells (e.g. cells 702, 703) and at least one first cell 671. It is assumed in this embodiment that there are no candidate cells outside the active set 799. In such case the ISI of any given cell in the active set 799 is a measured ISI, not an estimated ISI as in FIGS. 5 and 6. Accordingly, it may be checked if the ISI (measured ISI) from any given cell 701, 702, 703 in the active set is larger than a predetermined interference threshold. If the ISI is larger, the corresponding cell, e.g. the first cell 701, may be removed from the active set. If the ISI is not larger, the corresponding cell, e.g. the first cell 701, may be maintained in the active set.

Yet in one embodiment, even if the ISI from a given cell is larger than the interference threshold, the decision may be to keep or add the given cell in/to the active set and to suppress the transmission of relevant signals from the given cell. This may provide an advantage that the cell cannot allocate the same frequency and time resource to another UE which in turn avoids some inter-cell interference; and the cell is readily available in the active set if/when a time comes that the UE 590 e.g. moves closer to that cell. Then the network may simply stop the suppressing and start sending downlink signals also from that cell. The network need not do the addition process anymore at this point, since the cell has already earlier been added to the set.

In an embodiment, the amount of inter-symbol interference is determined by processing power delay profiles of the one or more first cells and the one or more second cells. After that the corresponding entity (either UE or network node) may determine whether or not the ISI is larger than the predetermined interference threshold.

Let us look at the proposed procedure according to some embodiments. Upon expiry of a measurement event for adding/replacing a new cell in the active set, the UE determines first from the new tentative active set, consisting of the new detected cell(s) to be added and the cells in the current active set without those cell(s) which are to be removed from the active set in case of a replace, the new positioning of the FFT window and the cells that would cause significant amount of ISI (i.e. expected ISI). Then, it sends in the measurement report the cell identifications, e.g. Physical Cell Identity (PCIs) of the cells, from the aforementioned tentative active set that would cause significant amount of ISI and the PCIs of the cells that would cause insignificant amount of ISI, i.e., PCIs not in the current active set would be treated by the network as the PCIs of newly detected cell(s). The network receiving the feedback information can either 1) include in the active set only the cells not causing significant ISI (keep the cells from the current active set not causing significant ISI and add newly detected cell(s) not causing significant ISI); or
2) add newly detected cell(s) in the active set and suppress the transmissions of the cells that would cause significant ISI, i.e., irrespective if it is a cell in current active set or a newly detected one.

In one embodiment of approach 1), the UE refrains from sending any measurement report if all the new cell(s) to be added to the active set would cause significant amount of ISI. This saves uplink resources as these cells would not be added to the active set anyway. Yet in one embodiment, the UE does send the measurement report to the network node (e.g. eNB or other network node at least partially controlling the active set of the UE). Then the network node may decide not to add to the active set such cells which are causing significant ISI. In one embodiment, the network node may decide add those cells to the active set, but suppress the transmission of relevant signals to the UE from those cells.

In these embodiments, the UE may make the decision of adding/removing the cells (first or second cells). In the application, first cells are cells which may or may not locate in the current active set whereas the second cell is a cell which is currently in the active set. As has been described, either or both type of cells may cause ISI to the combined signal.

In another implementation, the UE sends in the measurement report one or more of the following: the PDPs of the cells (e.g. second cell(s)) in the current active set without those cell(s) which are to be removed from the active set (in case of a replace event), PDPs of new cells (e.g. first cells) to be added to the active set, relative delay offsets of the PDPs, and optionally the selected synchronization time instant used for demodulation of the OFDM symbol. The network receiving the measurement report can then decide on the new configuration of the active set for the UE. Therefore, the UE need not make the decision here.

Instead of sending the entire PDPs, the UE could send a compressed indication providing information about how much the signal of cell from the aforementioned tentative active set is falling outside the FFT window. This allows the network to make the decision but save UL resources.

Moreover, the UE might inform the network about the cells in the current active set starting to cause ISI and request the network to either 1) remove the cell from the active set even though the configured measurement event for removing a cell did not expire; or
2) suppress the transmission of the cell (but keep it in the active set).

In the application a term "inhibiting the transmission of the signal/cell" is used to mean either to remove the cell or to suppress the transmission of the cell. This can happen when a shift in the FFT window positioning occurs due to UE movement and/or change in environment.

In one implementation, the UE sends to the network the PCIs of the cells in the active set starting to cause significant amount of ISI (i.e. measured ISI). In another implementation, the UE sends to the network the PDPs of the cells in the current active set along with their relative delay offsets (alternatively, the network may itself determine the relative delays) and optionally the selected synchronization time instant used for demodulation of the OFDM symbol. In still another implementation, the UE sends a compressed indication providing information about how much the signal of the cell in the current active set is falling outside the FFT window. Upon reception of the feedback information from the UE, the network can either 1) remove the cells causing ISI from the active set; or
2) suppress the transmission of the cells causing ISI (but keep them in the active set).

In general, the choice between 1) and 2) may depend on implementation or may be configured by a control parameter from O&M. For each of the different cases mentioned below, another or the same of the options 1) and 2) may be selected.

In some embodiments of the invention, a request from the UE to suppress the transmission of a cell may be interpreted by the network such that it removes the cell from the active set and/or vice versa.

As said, the UE may in some embodiments decide not to transmit the information of the ISI (also called a measurement report in the application) to the network. Thus, the UE may make a decision whether or not to transmit the information about the ISI (comprising e.g. the PDPs, PCIs, relative delay offsets of the PDPs, and selected synchronization time instant used for demodulation of the OFDM symbol, how much the signal of cell from the aforementioned tentative active set is falling outside the FFT window, for example).

In the following, some embodiments of the invention are explained at greater detail:

Part I:

Active set configuration and management upon an expiration of add/replace measurement event (=an add measurement event and/or a replace measurement event), or any other predetermined event.

Whenever an event for adding/replacing a cell from the active set has expired, i.e. event 1A or 1C or any other configured event, the UE determines from the new tentative active set, consisting of the new cells to be added and the current cells in the active set without those cell(s) which are to be removed from the active set (in case of a replace event), the new positioning of the FFT window which can be done as follows:

a) The UE estimates the PDP of the signal of each cell in the tentative active set along with their corresponding delay offsets. The delay offset between two PDPs may be defined as the difference between the arrival time instants of the first tap of each PDP (instead of arrival time instants another time instant such as peak time or final time instant may be taken). The estimation of PDP can be done using cell-specific reference signals, or synchronization signals or a combination of both.

b) The UE constructs the overall PDP from the individual PDPs computed in step 1 (as shown in FIG. 2a) and determines the position of the FFT window. The method for determining the position of the FFT window is left for UE implementation.

A cell to be added to the active set based on expiry of an add/replacement measurement event may be considered as a cell to be added to the active set provided that it would not cause significant ISI.

Case A:

UE determines from the current active set and new cells to be added/replaced the cell(s) that would cause significant ISI (expected ISI).

Using the overall PDP and the selected positioning of the FFT window, the UE determines the cells that would cause significant ISI. For instance, the receiver can determine if the taps stemming from one cell are causing more ISI than useful power or only ISI. In this case, the cell is deemed to cause significant amount of ISI. The network could as well assist the UE in selecting the cells that would cause significant ISI by configuring the UE with a threshold indicating in % the tolerable amount of ISI power a signal can generate, i.e., threshold=maximum ISI/total signal power.

In an embodiment, the determination that the inter-symbol interference from a given cell is less than the predetermined interference threshold may be made if the sum of power-delay taps of the signal from the given cell with a signal strength larger than a predetermined signal threshold received outside the common time window used for demodulating the combined signal obtained is less than the predetermined interference.

The predetermined interference and signal thresholds may be empirically derived or based on mathematical modelling.

Then, the UE sends in the measurement report the following new Information Elements (IEs):
PCIs of the cells from the aforementioned tentative active set causing significant amount of ISI.
PCIs of the cells from the aforementioned tentative active set causing insignificant amount of ISI.

If the network knows the cells of the tentative active set, it is sufficient if the UE provides only one of these information elements because the network can then determine the other information element (IE). The first of the new IEs may be considered as an information that a significant ISI is caused by the cell, thus requesting that a transmission of the signal by the cell is inhibited (cell is removed or the transmission is suppressed).

The network receiving the measurement report can either 1) include in the active set only the cells not causing ISI (keep the cells from the current active set not causing ISI and add newly detected cell(s) not causing ISI) or 2) Add newly detected cell(s) in the active set and suppress the transmissions of the cells that would cause ISI, i.e., irrespective if it is a cell in current active set or newly detect one.

If the first approach 1) is followed and in the special case when all the new cell(s) to be added to the active set would cause significant amount of ISI, the UE refrains from sending any measurement report and in turn avoid adding new cell(s) in the active set, i.e., reduces signalling overhead as well.

After the UE decided which cells must not transmit (or even not added/maintained in the active set), it may determine again a time window for FFT for the remaining cells.

Case B:

The network determines from the current active set and new cells to be added/replaced the cell(s) that would cause significant ISI Upon the expiry of the add/replace measurement event, the UE sends e.g. in the measurement report one or more of the following new IEs:
PDPs of the cells in the current configured active set without those cell(s) which are to be removed/replaced from the active set
PDPs of the new cell(s) to be added
Relative Delay offsets between the PDPs
Optionally: Selected synchronization time instant for demodulation of the OFDM symbol In a different implementation according to an embodiment of the invention, the UE could send a compressed indication providing information about how much the signal of cell from the aforementioned tentative active set is falling outside the FFT window.

Using this feedback information, the network can derive the cells causing significant amount of ISI and decide on either 1) removing these cell(s) from the active set or 2) suppressing their transmissions (but keeping/adding them to the active set).

Part II:

Removing cell(s) from the active set even without the expiry of remove measurement event or suppressing their transmission when they start to cause significant ISI A UE configured with an active set of cells may constantly update the position of the FFT window to account for the changes in the delays of the received signals caused by UE movement or by variations in the environment. As such, it could happen that at some instant some of the cells in the active set start to generate significant amount of ISI and should be either 1) removed from the active set although the measurement event 1B (or similar event) for removing a cell did not expire or 2) kept in the active set but with suppressed transmission.

Case A:

UE determines from the current active set the cells causing significant ISI (measured ISI).

In this case, the UE informs the network about the PCIs of the cells that are generating significant amount of ISI. Upon the reception of the message from the UE, the network can either 1) remove the cell(s) recommended by the UE from the active set or 2) suppress their transmissions.

Case B:

The network determines from the current active set the cells causing significant ISI In a first implementation according to some embodiments of the invention, the UE reports to the network one or more of the following:
PDPs of the cells in the current active set in addition to their corresponding relative delay offsets
Optionally: selected synchronization time instant for demodulation of the OFDM symbol In a second implementation according to some embodiments of the invention, the UE could send a compressed indication providing information about how much the signal of a cell from the current active set is falling outside the FFT window.

Upon the reception of the message from the UE, the network can derive the cells causing significant amount of ISI and decide on either 1) removing these cell(s) from the active set or 2) suppressing their transmissions.

Part III:

Adding cell(s) to the active set even without the expiry of an add/replace measurement event In some embodiments of the invention, the UE may scan its environment for cells which potentially may serve the UE (candidate cell) and which would not cause significant ISI (expected ISI). For example, the UE may perform such scan on a regular (periodic) base, or event-driven, e.g. in a case that another cell is removed from the active set.

If such a cell is identified, in some embodiments of the invention, the identified cell may be added to the active set, regardless of whether or not the criteria on signal strength/signal quality for adding a cell to the active set are fulfilled. In some embodiments of the invention, the terminal will first check if a criterion on signal strength/signal quality is fulfilled, and the terminal will propose to add the cell to the active set only if such a criterion on signal strength/signal quality is fulfilled and the expected ISI is not significant.

In these embodiments, cells may be added to the active set which do not have a high power at the terminal but nevertheless contribute constructively to the received signal. This might be beneficial if the UE is at the cell edges of plural cells such that none (or hardly any) of the cells provides a sufficient signal strength, but the added signals from the cells might be sufficient to demodulate the signal.

As discussed for Part I and Part II, according to Part III either the terminal may decide if a candidate cell causes significant ISI (significant expected ISI) and inform the network if a candidate cell is expected to cause insignificant ISI, or the terminal may inform the network on the measurement results (PDPs of the cells in the current configured active set without those cell(s) which are to be removed from the active set; PDPs of the new cell(s) to be added; Relative Delay offsets between the PDPs; optionally: Selected synchronization time instant for demodulation of the OFDM symbol), and the network evaluates whether or not the expected ISI is significant. In the former case, if the UE decides that the expected ISI will be significant, it may not inform the network on the evaluation result, thus saving signalling overhead.

In a further implementation according to some embodiments of the invention, the network exploits reciprocity and makes use of uplink measurements received by the cells in the active set to estimate the overall PDP and determine if there are some cell(s) in the active set generating significant ISI. This implementation is particularly useful if UEs permanently transmit such that the network can measure the uplink.

Conventionally, the network does not know how the UE performs the time synchronization and position the FFT window for demodulation. In some embodiments, the UE provides corresponding information to the network, e.g. upon request from the network. Alternatively, the network may make a rational guess about the synchronization time instant and positioning of the FFT window. Thus, the network may determine the cells causing significant amount of ISI.

In general, and in particular for the cases when the UE sends information to the network about the cells in the current active set starting to cause significant ISI (i.e., Part II), the UE may apply a timer before sending the feedback information to the network to avoid a reaction on outliers, e.g. reaction on an instantaneous ISI which is not persistent.

Figure 8:
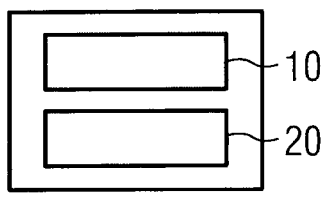
FIG. 8 shows an apparatus according to an example embodiment of the invention.
Figure 9:
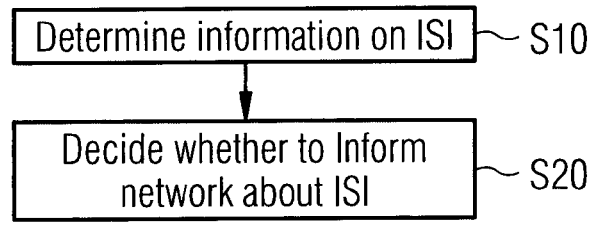
FIG. 9 shows a method according to an example embodiment of the invention.

FIG. 8 shows an apparatus according to an example embodiment of the invention. The apparatus may be a terminal such as a UE, or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises determining means 10 and deciding means 20. The determining means 10 and deciding means 20 may be a determining circuitry and deciding circuitry, respectively.

The determining means 10 determines an information on an inter-symbol interference between signals on a same frequency resource and a same time resource from one or more first cells and one or more second cells (S10). Each of the one or more first cells is different from each of the second cells. An active set of the apparatus comprises at least the one or more second cells and may additionally comprise one or more of the first cells. If at least one of the one or more first cells is not in the active set, the inter-symbol interference is an estimated inter-symbol interference. If the active set consists of the one or more first cells (i.e. all the first cells) and the one or more second cells, the inter-symbol interference is a measured inter-symbol interference.

The deciding means 20 decided whether or not to inform a network comprising the one or more first cells and the one or more second cells on the information on the inter-symbol interference (S20). In some embodiments, the informing (S20) may be considered as a request to inhibit transmission of the signal (by removing the cell or by suppressing the transmission) from at least one of the cells in the tentative active set if the inter-symbol interference from the corresponding cell or cells is larger than a predetermined interference threshold. One way of inhibiting also includes not adding the cell causing too much ISI to the active set.

Figure 10:
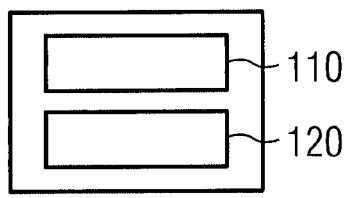
FIG. 10 shows an apparatus according to an example embodiment of the invention.
Figure 11:
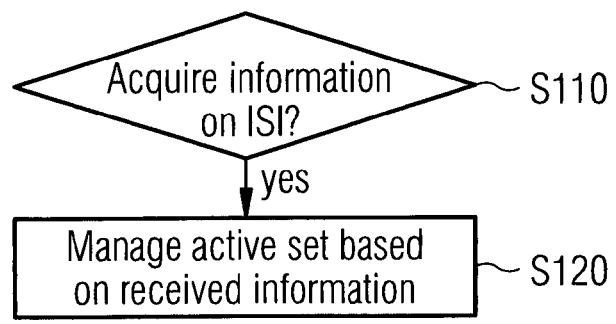
FIG. 11 shows a method according to an example embodiment of the invention.

FIG. 10 shows an apparatus according to an example embodiment of the invention. The apparatus may be a network element representing a network such as a base station (e.g. NodeB, eNodeB) of a controller of a radio network (e.g. a radio network controller), or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises acquiring means 110 and managing means 120. The acquiring means 110 and managing means 120 may be an acquiring circuitry and managing circuitry, respectively.

The acquiring means 110 acquires information about an inter-symbol interference at a terminal. The inter-symbol interference may exist between signals from one or more first cells and one or more second cells. An active set of the terminal comprises at least the one or more second cells. Each of the one or more first cells is different from each of the one or more second cells. If at least one of the one or more first cells is not in the active set, the inter-symbol interference is an estimated inter-symbol interference. In such case it may be assumed that a tentative active set of the terminal would consist of the one or more first cells outside the current active set and the one or more second cells inside the current active set. If the active set consists of the one or more first cells and the one or more second cells (i.e. all cells are inside the current active set), the inter-symbol interference is a measured inter-symbol interference.

The managing means 120 manages the active set based on the acquired information (S120). For example, depending on the acquired information, it may first calculate the ISI if the ISI is not directly available from the received information.

If the ISI is larger than a predetermined threshold, it may inhibit (remove or suppress) one or more cells (first and/or second cells) from transmitting the signal. One way of inhibiting also includes not adding the cell causing too much ISI to the active set.

The ISI information may be acquired from the terminal, in which case the information may comprise PCIs, PDPs, etc. as has been explained above. In such case the information may also comprise a request from the UE to add/remove/suppress a cell to/from the active set. In another embodiment, the information is acquired at least partially based on messages received from one or more cells belonging to the active set, the received messages comprising an indication about uplink measurements between the terminal and one or more cells belonging to the active set. In other words, the network could exploit reciprocity and make use of uplink measurements received by the cells in the active set to estimate the overall PDP and determine if there are some cell(s) in the active set that are generating significant ISI.

Figure 12:
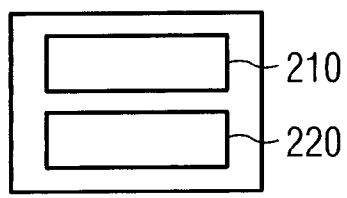
FIG. 12 shows an apparatus according to an example embodiment of the invention.
Figure 13:
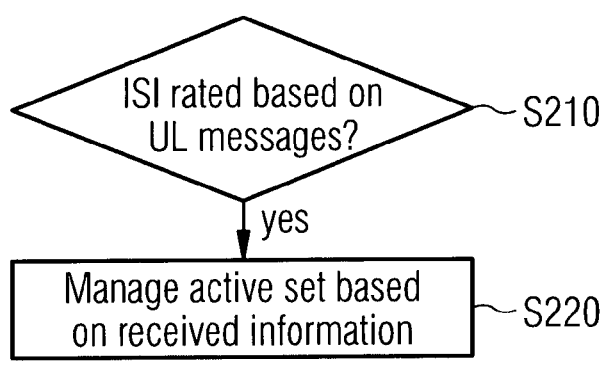
FIG. 13 shows a method according to an example embodiment of the invention.

FIG. 12 shows an apparatus according to an example embodiment of the invention. The apparatus may be a network element representing a network such as a base station (e.g. NodeB, eNodeB) of a controller of a radio network (e.g. a radio network controller), or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises rating means 210 and managing means 220. The rating means 210 and managing means 220 may be a rating circuitry and managing circuitry, respectively.

The rating means 210 rates an inter-symbol interference at a terminal between signals received from one or more first cells and one or more second cells (S210). The rating (S210) by the rating means 210 is based on respective uplink messages from the terminal received by the one or more first cells and the one or more second cells. Each of the one or more first cells is different from each of the one or more second cells. If at least one of the one or more first cells is not in the active set, the inter-symbol interference is an estimated inter-symbol interference. If the active set consists of the one or more first cells and the one or more second cells, the inter-symbol interference is a measured inter-symbol interference.

The managing means 220 manages the active set based on the received information (S220). The managing may be similar to that of step S120.

Figure 14:
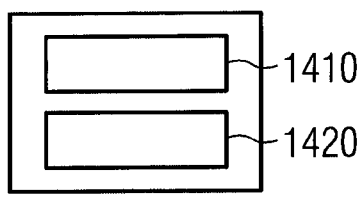
FIG. 14 shows an apparatus according to an example embodiment of the invention.

FIG. 14 shows an apparatus according to an example embodiment of the invention. The apparatus comprises at least one processor 1410, at least one memory 1420 including computer program code, and the at least one processor 1410, with the at least one memory 1420 and the computer program code, being arranged to cause the apparatus to at least perform at least one of the methods according to FIGS. 9, 11, and 13 and related description.

In an embodiment at least some of the functionalities of the apparatus may be shared between two physically separate devices forming one operational entity. Therefore, the apparatus may be seen to depict the operational entity comprising one or more physically separate devices for executing at least some of the described processes. The apparatus utilizing such shared architecture, may comprise a remote control unit (RCU), such as a host computer or a server computer, operatively coupled (e.g. via a wireless or wired network) to a remote radio head (RRH) located in the base station. In an embodiment, at least some of the described processes may be performed by the RCU. In an embodiment, the execution of at least some of the described processes may be shared among the RRH and the RCU.

In an embodiment, the RCU may generate a virtual network through which the RCU communicates with the RRH. In general, virtual net-working may involve a process of combining hardware and software network resources and network functionality into a single, software-based administrative entity, a virtual network. Network virtualization may involve platform virtualization, often combined with resource virtualization. Network virtualization may be categorized as external virtual networking which combines many net-works, or parts of networks, into the server computer or the host computer (i.e. to the RCU). External network virtualization is targeted to optimized network sharing. Another category is internal virtual networking which provides net-work-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Some aspects of embodiments of the invention may be defined as follows:

a) A communication system where multiple cells ("active set") jointly transmit signals to a UE, so that the joint transmission considers information about the delay profile of the candidate cells with respect to the UE.

b) A communication system according to aspect a), wherein the UE reports information about the delay profile of the cells inside the current active set to the network. There is provided a communication system wherein the network excludes cells from the current active set when a criterion related to the information about the delay profile is fulfilled. There is provided a communication system wherein the network suppresses the transmission ("blanking") of cells from the current active set when a criterion related to the information about the delay profile is fulfilled.

c) A communication system according to aspect a), wherein the UE reports information about the delay profile of newly detected cells outside the current active set to the network. There is provided a communication system wherein the network only adds/replaces cells in the active set when a criterion related to the information about the delay profile is fulfilled. There is provided a communication system wherein the network add/replaces cells to the active set but suppress the transmission of newly detected cells when a criterion related to the information about the delay profile is fulfilled.

d) A communication system according to aspect b) or c), wherein the information is one of: PCI of cells causing significant amount of ISI and PCIs of cells causing insignificant amount of ISI; or PDP of cells, the relative delay offsets between the PDPs, and selected synchronization time instant for demodulation of OFDM symbol; or compressed indication providing information about how much the signal of cell is falling outside the FFT window e) A communication system according to aspect a), wherein the triggering condition for a measurement report contains a criterion related to the delay profile of the cell.

f) A communication system according to aspect a), wherein the UE will not report cells which fulfil a criterion related to the delay profile.

g) A communication system according to aspect a), wherein the joint transmission method is non-coherent ("SFN").

In the following, some embodiments are defined.

In an embodiment, there is provided a method comprising determining, by a terminal device, an information on an inter-symbol interference between signals on a same frequency resource and a same time resource from one or more first cells and one or more second cells, wherein an active set of the apparatus comprises at least the one or more second cells, the inter-symbol interference is an estimated inter-symbol interference if at least one of the one or more first cells is not in the active set, and the inter-symbol interference is a measured inter-symbol interference if the active set consists of the one or more first cells and the one or more second cells; and deciding whether or not to inform a network comprising the one or more first cells and the one or more second cells on the information on the inter-symbol interference. In some embodiment, the decision to transmit the information to the network is implicit, as the transmission is automatic.

In an embodiment, the information comprises an indication how much the signal of a given cell is falling outside a common time window used for demodulating a combined signal, wherein the combined signal is obtained by combining the signals from the one or more first cells and the one or more second cells.

In an embodiment, the information comprises at least one of one or more first power delay profiles of the respective signals received from the one or more first cells, one or more second power delay profiles of the respective signals from the one or more second cells, one or more delays between at least one of the first power delay profiles and one of the second power delay profiles, and an indication of a time instant of the common time window used for demodulating the combined signal.

In an embodiment, the information comprises at least one of an indication of at least one cell causing inter-symbol interference above the predetermined interference threshold, and an indication of at least one cell causing inter-symbol interference below the predetermined interference threshold.

In an embodiment, the amount of inter-symbol interference is determined by processing power delay profiles of the one or more first cells and the one or more second cells.

In an embodiment, the method further comprises detecting that one or more cells of the active set cause inter-symbol interference above a predetermined interference threshold to the combined signal; and deciding to inform the network and including an identification of the detected one or more cells in the information to the network.

In an embodiment, the method further comprises detecting that one or more first cells outside the active set and applicable to be added to the active set do not cause inter-symbol interference above the predetermined interference threshold to the combined signal; and deciding to inform the network and including an identification of the detected one or more first cells in the information to the network.

In an embodiment, the method further comprises determining that each of the one or more first cells belongs to the active set; checking if the inter-symbol interference from any of the cells inside the active set exceeds a predetermined interference threshold; and deciding not to inform the network if the inter-symbol interference does not exceed the predetermined interference threshold.

In an embodiment, the method further comprises determining that at least one of the one or more first cells is outside the active set; checking if the inter-symbol interference from any of the first cells outside the active set exceeds the predetermined interference threshold; and deciding not to inform the network regarding these cells if the inter-symbol interference from any of the first cells outside the active set exceeds the predetermined interference threshold.

In an embodiment, the checking comprises determining that the inter-symbol interference from a given cell is less than the predetermined interference threshold if the sum of power-delay taps of the signal from the given cell with a signal strength larger than a predetermined signal threshold received outside the common time window used for demodulating a combined signal obtained by combining the signals from the one or more first cells and the one or more second seconds is less than the predetermined interference.

In an embodiment, the informing of the network comprises a request to the network to inhibit a transmission of the signal by any of the cells which cause inter-symbol interference above the predetermined interference threshold.

There is also provided a method, comprising: acquiring, by a network node, information about an inter-symbol interference at a terminal between signals from one or more first cells and one or more second cells, wherein an active set of the terminal comprises at least the one or more second cells, wherein the inter-symbol interference is an estimated inter-symbol interference if at least one of the one or more first cells is not in the active set, and the inter-symbol interference is a measured inter-symbol interference if each of the one or more first cells is in the active set; and managing the active set based on the information.

In an embodiment, the information is received from the terminal and comprises at least one of an indication how much the signal of a given cell is falling outside a common time window used for demodulating a combined signal obtained by combining the signals from the one or more first cells and the one or more second cells, one or more first power delay profiles of the respective signals from the one or more first cells, one or more second power delay profiles of the respective signals from the one or more second cells, and one or more delays between at least one of the first power delay profiles and at least one of the second power delay profiles, an indication of a time instant of the common time window.

In an embodiment, the method further comprises determining, based on the information, the amount of inter-symbol interference caused by a given cell.

In an embodiment, the information is received from the terminal and comprises at least one of an indication of at least one cell causing inter-symbol interference above the predetermined interference threshold, and an indication of at least one cell causing inter-symbol interference below the predetermined interference threshold.

In an embodiment, the information is acquired at least partially based on messages received from one or more cells belonging to the active set, the received messages comprising an indication about uplink measurements between the terminal and one or more cells belonging to the active set.

In an embodiment, the managing comprises adding a given first cell outside the active set to the active set, if the inter-symbol interference from the given first cell is below a predetermined interference threshold and the given first cell is applicable to be added to the active set.

1 In an embodiment, the managing comprises adding all indicated first cells to the active set; and inhibiting the transmission of the signal from one or more given first cells, if the inter-symbol interference from each of the one or more given cells is above a predetermined interference threshold.

In an embodiment, the managing comprises inhibiting the transmission of the signal from the given cell in the active set, if the inter-symbol interference from the given cell in the active set is above a predetermined interference threshold.

In an embodiment, the inhibiting comprises suppressing the transmission of the signal from the given cell, or removing the cell from the active set.

In an embodiment, the inhibiting takes place even if the signal strength from the corresponding cell is strong enough to be applicable to be added to or kept in the active set.

In some embodiments of the invention, the UE decides (judges) whether or not significant ISI is caused by a cell and informs the network both on the judgment and on the measurement results (PDPs, relative delay, or the corresponding compressed information). Thus, the network may verify the judgment by the UE.

Instead of demodulation by FFT, other demodulation techniques such as a Fourier transformation may be used. Instead of PCI, another identifier of the cells (e.g. CGI) may be transmitted from UE to the network.

A replacement of a first cell of an active set by a second cell may be considered as simultaneously removing the first cell from the active set and adding the second cell to the active set.

One piece of information may be transmitted in one or plural messages from one entity to another entity. Each of these messages may comprise further (different) pieces of information.

Names of network elements, protocols, and methods are based on current standards. In other versions or other technologies, the names of these network elements and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software.

Some example embodiments of the invention may be applied to a 5G network. However, some example embodiments may be applied to other radio access technologies offering a single frequency network, such as some 3GPP networks (e.g. LTE, LTE-A). Some embodiments of the invention may be applied to wired access technologies, too, offering a single frequency network. Some embodiments of the invention may be applied to access points instead of cells of a 3GPP network or to a mixture of access points and 3GPP cells. I.e., in these embodiments, the active set comprises one or more access points.

A terminal may be any kind of terminal which may attach to the respective network. E.g., a terminal may be a UE, a device of a machine-type communication, a laptop, a smartphone, a mobile phone etc.

According to the above description, it should thus be apparent that example embodiments of the present invention provide, for example a terminal such as a UE or a device of a machine type communication, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example a base station such as a NodeB or an eNodeB, or a controller thereof such as a radio network controller, or a component of one of them, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques, means, entities, units, devices, or methods include, as non-limiting examples, implementations as hardware, software, firmware, special purpose circuits or logic, general purpose hardware or controller or other computing devices, a virtual machine, or some combination thereof.

It should be noted that the description of the embodiments is given by way of example only and that various modifications may be made without departing from the scope of the invention as defined by the appended claims.

The invention claimed is:

1. A method, comprising:
   determining, by a terminal device, an information on an inter-symbol interference between signals on a same frequency resource and a same time resource from one or more first cells and one or more second cells, wherein an active set of the terminal device comprises at least the one or more second cells, the inter-symbol interference is an estimated inter-symbol interference if at least one of the one or more first cells is not in the active set, and the inter-symbol interference is a measured inter-symbol interference if the active set consists of the one or more first cells and the one or more second cells; and
   deciding whether or not to inform a network comprising the one or more first cells and the one or more second cells on the information on the inter-symbol interference determined by the terminal device.

2. The method according to claim 1, wherein the information comprises at least one of the following:
   an indication how much the signal of a given cell is falling outside a common time window used for demodulating a combined signal, wherein the combined signal is obtained by combining the signals from the one or more first cells and the one or more second cells;
   at least one of one or more first power delay profiles of the respective signals received from the one or more first cells, one or more second power delay profiles of the respective signals from the one or more second cells, one or more delays between at least one of the first power delay profiles and one of the second power delay profiles, and an indication of a time instant of the common time window used for demodulating the combined signal; and
   at least one of an indication of at least one cell causing inter-symbol interference above the predetermined interference threshold, and an indication of at least one cell causing inter-symbol interference below the predetermined interference threshold.

3. The method according to claim 1, further comprising:
  detecting that one or more cells of the active set cause inter-symbol interference above a predetermined interference threshold to the combined signal; and
  deciding to inform the network and including an identification of the detected one or more cells in the information to the network.

4. The method according to claim 1, further comprising:
  detecting that one or more first cells outside the active set and applicable to be added to the active set do not cause inter-symbol interference above the predetermined interference threshold to the combined signal; and
  deciding to inform the network and including an identification of the detected one or more first cells in the information to the network.

5. The method according to claim 1, further comprising:
  determining that each of the one or more first cells belongs to the active set;
  checking if the inter-symbol interference from any of the cells inside the active set exceeds a predetermined interference threshold; and
  deciding not to inform the network if the inter-symbol interference does not exceed the predetermined interference threshold.

6. The method according to claim 1, further comprising:
  determining that at least one of the one or more first cells is outside the active set;
  checking if the inter-symbol interference from any of the first cells outside the active set exceeds the predetermined interference threshold; and
  deciding not to inform the network regarding these cells if the inter-symbol interference from any of the first cells outside the active set exceeds the predetermined interference threshold.

7. The method according to claim 1, wherein informing of the network comprises a request to the network to inhibit a transmission of the signal by any of the cells which cause inter-symbol interference above the predetermined interference threshold.

8. A method, comprising:
  acquiring, by a network node, information about an inter-symbol interference at a terminal between signals from one or more first cells and one or more second cells, wherein an active set of the terminal comprises at least the one or more second cells, wherein the inter-symbol interference is an estimated inter-symbol interference if at least one of the one or more first cells is not in the active set, and the inter-symbol interference is a measured inter-symbol interference if each of the one or more first cells is in the active set; and
  managing the active set based on the information.

9. The method according to claim 8, wherein the information is acquired at least partially based on messages received from one or more cells belonging to the active set, the received messages comprising an indication about uplink measurements between the terminal and one or more cells belonging to the active set.

10. The method according to claim 9, wherein the managing comprises:
  adding a given first cell outside the active set to the active set, if the inter-symbol interference from the given first cell is below a predetermined interference threshold and the given first cell is applicable to be added to the active set.

11. The method according to claim 10, wherein the managing comprises:
  adding all indicated first cells to the active set; and
  inhibiting the transmission of the signal from one or more given first cells, if the inter-symbol interference from each of the one or more given cells is above a predetermined interference threshold.

12. An apparatus, comprising at least one processor and at least one memory including computer program code, wherein the at least one processor, with the at least one memory and the computer program code, is arranged to cause the apparatus at least to:
  determine an information on an inter-symbol interference between signals on a same frequency resource and a same time resource from one or more first cells and one or more second cells, wherein an active set of the apparatus comprises at least the one or more second cells, the inter-symbol interference is an estimated inter-symbol interference if at least one of the one or more first cells is not in the active set, and the inter-symbol interference is a measured inter-symbol interference if the active set consists of the one or more first cells and the one or more second cells; and
  decide whether or not to inform a network comprising the one or more first cells and the one or more second cells on the information on the inter-symbol interference.

13. The apparatus according to claim 12, wherein the information comprises at least one of the following:
  an indication how much the signal of a given cell is falling outside a common time window used for demodulating a combined signal, wherein the combined signal is obtained by combining the signals from the one or more first cells and the one or more second cells;
  at least one of one or more first power delay profiles of the respective signals received from the one or more first cells, one or more second power delay profiles of the respective signals from the one or more second cells, one or more delays between at least one of the first power delay profiles and one of the second power delay profiles, and an indication of a time instant of the common time window used for demodulating the combined signal; and
  at least one of an indication of at least one cell causing inter-symbol interference above the predetermined interference threshold, and an indication of at least one cell causing inter-symbol interference below the predetermined interference threshold.

14. The apparatus according to claim 12, wherein the at least one processor, with the at least one memory and the computer program code, is arranged to further cause the apparatus to:
  detect that one or more cells of the active set cause inter-symbol interference above a predetermined interference threshold to the combined signal; and
  decide to inform the network and including an identification of the detected one or more cells in the information to the network.

15. The apparatus according to claim 12, wherein the at least one processor, with the at least one memory and the computer program code, is arranged to further cause the apparatus to:
  detect that one or more first cells outside the active set and applicable to be added to the active set do not cause inter-symbol interference above the predetermined interference threshold to the combined signal; and
  decide to inform the network and including an identification of the detected one or more first cells in the information to the network.

16. The apparatus according to claim 12, wherein the at least one processor, with the at least one memory and the computer program code, is arranged to further cause the apparatus to:
- determine that each of the one or more first cells belongs to the active set;
- check if the inter-symbol interference from any of the cells inside the active set exceeds a predetermined interference threshold; and
- decide not to inform the network if the inter-symbol interference does not exceed the predetermined interference threshold.

17. The apparatus according to claim 12, wherein the at least one processor, with the at least one memory and the computer program code, is arranged to further cause the apparatus to:
- determine that at least one of the one or more first cells is outside the active set;
- check if the inter-symbol interference from any of the first cells outside the active set exceeds the predetermined interference threshold; and
- decide not to inform the network regarding these cells if the inter-symbol interference from any of the first cells outside the active set exceeds the predetermined interference threshold.

18. The apparatus according to claim 12, wherein informing of the network comprises a request to the network to inhibit a transmission of the signal by any of the cells which cause inter-symbol interference above the predetermined interference threshold.

19. A non-transitory computer program product comprising a set of instructions which, when executed by a processor, is configured to cause the apparatus to perform the method according to claim 1.

20. A non-transitory computer program product comprising a set of instructions which, when executed by a processor, is configured to cause the apparatus to perform the method according to claim 8.

\* \* \* \* \*